Patented Feb. 9, 1932

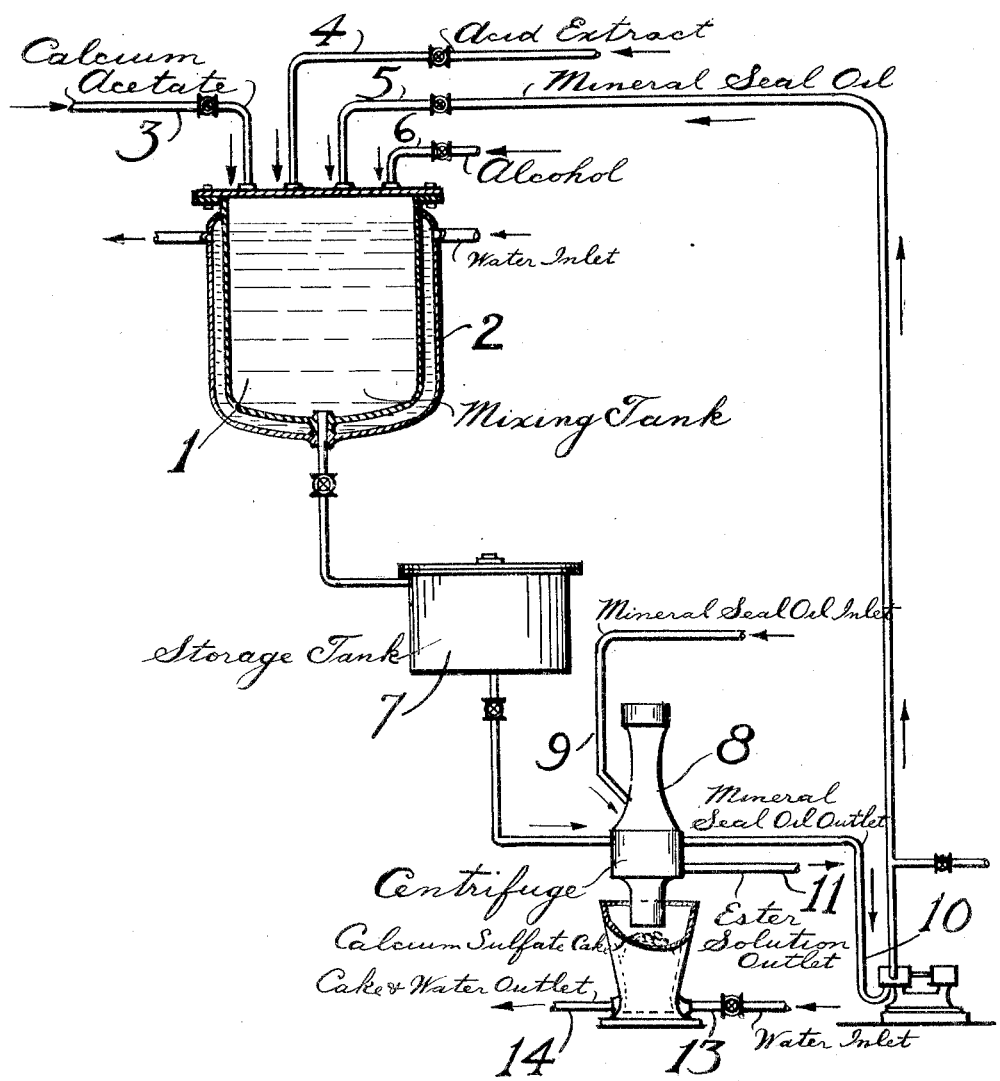

1,844,536

UNITED STATES PATENT OFFICE

FRANCIS M. ARCHIBALD AND ROBERT B. LEBO, OF ELIZABETH, NEW JERSEY, ASSIGNORS TO STANDARD OIL DEVELOPMENT COMPANY, A CORPORATION OF DELAWARE

DIRECT ESTERIFICATION OF ALKYL SULPHATES

Application filed September 5, 1930. Serial No. 479,846.

This invention relates to an improved process for direct esterification of alkyl sulphates. It has already been proposed to prepare esters directly from alkyl sulphates by means of calcium acetate. Such a process is described in U. S. Patent No. 1,365,050 to C. Ellis and M. J. Cohen, issued January 11 1921. It has also been proposed to carry out the esterification of the acid liquor with calcium acetate in the presence of a solvent such as mineral seal oil. The present invention relates to an improvement on the latter process and will be understood from the following description, read in conjunction with the drawing the sole figure of which is a diagrammatic side elevation, partly in section, of an appropriate apparatus for carrying out the process.

In the figure, the numeral 1 designates a mixing tank provided with an appropriate stirrer (not shown) and a jacket 2, through which cold or hot water may be circulated according to the temperature at which the content of the tank is to be maintained. 3, 4, 5 and 6 are inlet lines for calcium acetate, acid extract, mineral seal oil and alcohol, respectively. 7 is a storage tank provided with a stirrer (not shown), serving mainly for operating convenience and allowing to feed the centrifuge 8 slowly. 9 is an inlet line for mineral seal oil, 10 an outlet line for mineral seal oil, 11 an outlet line for the mineral seal oil solution of ester. Bin 12 serves for receiving the calcium sulphate cake from the centrifuge and is provided with water inlet line 13 and outlet line 14 to flush out the sulphate.

In the process of direct esterification, calcium acetate is caused to react with an acid extract which is a product of scrubbing an olefin containing hydrocarbon gas with sulphuric acid. The active ingredient in the reactive acid liquor is an alkyl sulphate, which enters into a double decomposition with the calcium acetate. The end products are calcium sulphate and alkyl acetate or alkyl acetates such as ethyl, propyl-, butyl-, amyl-acetate, etc., according to the composition of the reacting acid liquor serving as raw material for the process. The reaction is carried out in a suitable mixer. Calcium acetate and mineral seal oil form the materials charged. The success of the process depends on obtaining the calcium sulphate precipitate in such a form that the alkyl acetate may be extracted from it quite completely. The use of mineral seal oil for a solvent is to this end. The alkyl acetate solution in mineral seal oil is extracted from the calcium sulphate in a wire basket centrifuge. The cake in the centrifuge is further washed with mineral seal oil to increase the yield of alkyl acetate. The mixer is operated with cooling water at the beginning. After two hours or so the temperature is raised to 60° C. or more to complete the reaction.

In such a process it happens sometimes that the calcium sulphate forms in such a state that extraction and washing become very difficult and a low yield of alkyl acetate is obtained. Such trouble usually accompanies variations in the quality or composition of the acid extract. We have discovered that in such a case the addition of plaster of Paris, anhydrite, Attapulgus clay, anhydrous sodium sulphate, or other hygroscopic solid to the mixture of calcium acetate during the direct esterification process produces a calcium sulphate precipitate which may be washed directly. The plaster of Paris or other hygroscopic solid material is added to the charge in the mixer when the operator discovers that the precipitate is in a bad state or when a chemical analysis of the charge indicates the necessity of such addition. We do not know the exact nature of the action of the hygroscopic solid material but think that a possible explanation of the improvement obtained thereby is that the graining of the calcium sulphate may be so affected by the presence of the hygroscopic solid material that the mother liquor may be washed out more completely.

The amount of plaster of Paris necessary for proper precipitation of the calcium sulphate depends on the quality of the mixture and the operating conditions and cannot be stated in exact figures. In many cases 2–9% of the amount of calcium acetate will give a good result. However, the best way of finding out this amount is by experimentation with a sample of the alkyl sulphate.

The following materials were charged into the mixing tank: 575 gallons of reactive acid liquod of specific gravity 1.22, obtained by washing refinery gases with sulphuric acid and consisting of a mixture of mono- and di-alkyl sulphates and free sulphuric acid;

260 gallons of mineral seal oil previously used in washing the cake in the centrifuge;

4,400 pounds of calcium acetate.

The content of tank 1 was mixed cold for two hours while agitation was maintained, then the charge was heated to about 85° C. during three quarters of an hour and 270 gallons of alcohol were added, since the original acid extract contained only about 60% of the amount of alcohol which is equivalent to the acetic acid of the 4,400 pounds of calcium acetate. The whole mixture was then agitated for 30 minutes more in order to complete the reaction, the main products of which are alkyl acetates and calcium sulphate. During the last mentioned agitation a sample was taken and centrifuged with the result that the mother liquor did not separate properly from the calicum sulphate cake and the recovery of alkyl acetates was only 77%. In order to insure proper separation of the mother liquor, 220 pounds of plaster of Paris or 5% by weight of the calcium acetate were added to the tank and thoroughly admixed with its content. The mixture was then cooled to about 30° C. and discharged through tank 7 to the centrifuge 8 in which the mother liquor was separated from the calcium acetate. The remaining cake was twice washed with 130 gallons of mineral seal oil. This washing was set aside and added to tank 1 with the next charge. The alkyl acetates were separated from the mineral seal oil by means of distillation and gave a recovery of 97%.

Having thus described our invention what we claim is:

1. In the process of producing esters from alkyl sulphates by the action of calcium acetate and an organic inert solvent resulting in the formation of esters and calcium sulphate, the step which comprises adding a hygroscopic solid material to the reaction mixture to facilitate the separation of mother liquor from the calcium sulphate precipitate.

2. The process according to claim 1, in which the hygroscopic solid material consists of plaster of Paris.

FRANCIS M. ARCHIBALD.
ROBERT B. LEBO.